2,353,944

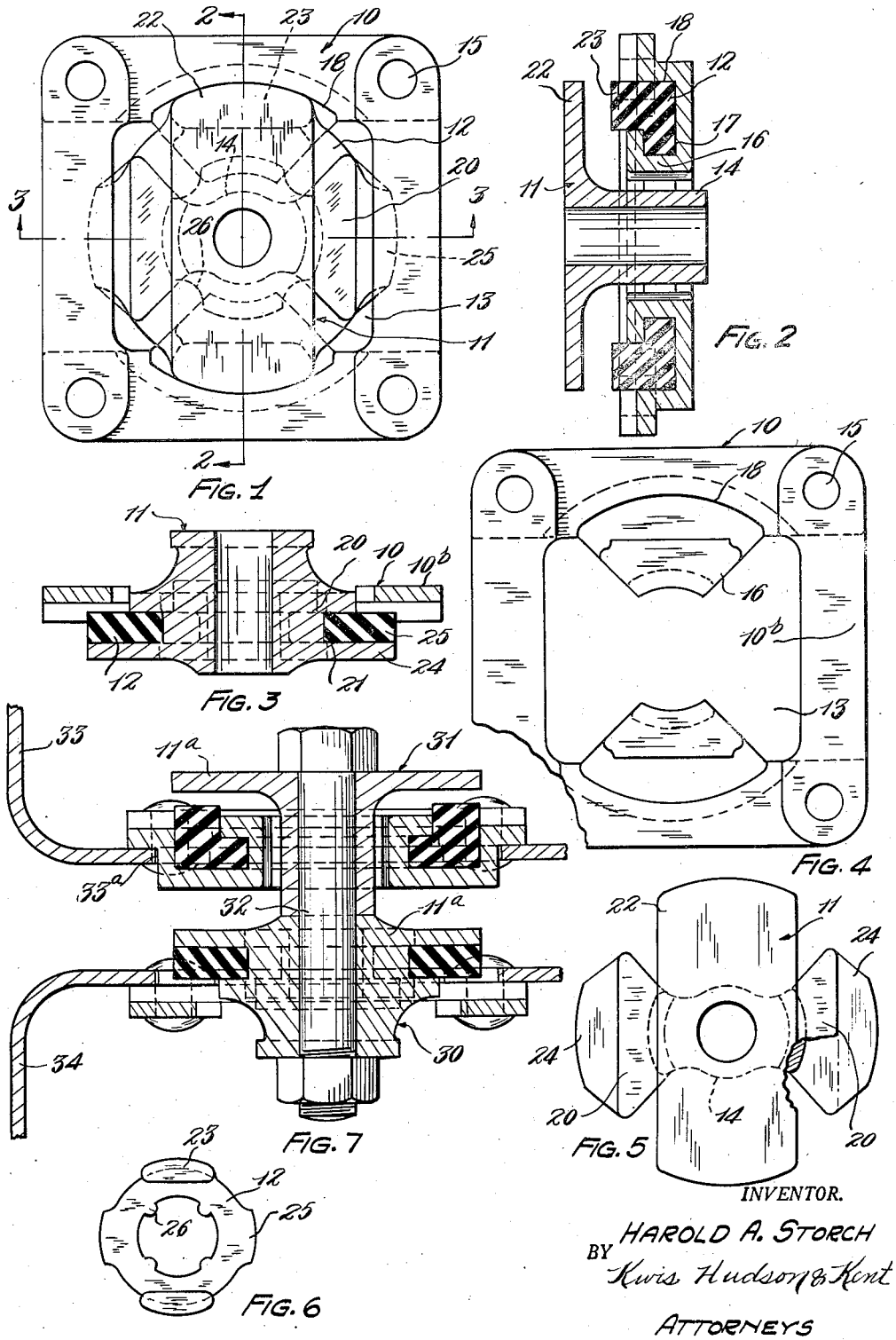
July 18, 1944.     H. A. STORCH     2,353,944
VIBRATION DAMPENER
Filed Aug. 5, 1942
INVENTOR.
HAROLD A. STORCH
BY Kwis Hudson & Kent
ATTORNEYS Patented July 18, 1944

UNITED STATES PATENT OFFICE 2,353,944

VIBRATION DAMPENER

Harold A. Storch, Fairview Village, Ohio, assignor to Harris Products Company, Cleveland, Ohio, a corporation of Ohio Application August 5, 1942, Serial No. 453,620

6 Claims. (Cl. 248—358)

This invention relates to spring devices of the kind used to form shock absorbing and vibration dampening mountings for sensitive instruments and various other bodies and aims to provide an improved and simplified construction for devices of this kind enabling such devices to be economically manufactured and assembled and permitting the easy installation and servicing of the instruments or other bodies to be supported.

Another object of the invention is to provide an improved construction for a vibration dampener of this character wherein bumper means embodied in the device serves to limit the relative movement between the yieldably connected members of the device.

A further object of the invention is to provide an improved construction for a vibration dampener in which one of a pair of members yieldably connected by a body of rubber has stop elements thereon which cooperate with portions of the rubber body for limiting relative movement between the connected members.

The invention may be further briefly summarized as consisting in certain novel combinations and arrangements of parts hereinafter described and particularly set out in the appended claims.

In the accompanying sheet of drawings,

Fig. 1 is a plan view of a vibration dampener embodying my invention;

Fig. 2 is a sectional elevation taken through the device on line 2—2 of Fig. 1;

Fig. 3 is another sectional elevation taken through the device on line 3—3 of Fig. 1;

Fig. 4 is a plan view showing the plate member of the device in detached relation;

Fig. 5 is a detached plan view of the spider member with portions thereof broken away;

Fig. 6 is a detached plan view of the resilient rubber body; and

Fig. 7 is a sectional elevation taken through a mounting assembly embodying a plurality of my vibration dampeners.

My vibration dampener comprises in general a pair of cooperating members 10 and 11 and a body or ring of resilient rubber 12 flexibly connecting such members. One member of the pair, in this instance the member 10, may be adapted for connection with a bulkhead or other available support, and for convenience may be referred to as the plate member. The other member of the pair, that is the member 11, may be referred to as the spider member and is adapted for connection with an instrument, an instrument-carrying panel, or any other body to be mounted.

It will be understood, of course, that the connections can be reversed, that is to say, the spider member 11 can be connected with the bulkhead and the plate member 10 can be connected with the instrument or other body to be mounted. From the detailed description hereinafter given it will be apparent that the rubber body 12 connects the plate and spider members so as to permit both a relative axial movement and a substantially universal relative rocking or tilting movement for absorbing shocks and vibrations. A vibration dampener of the kind herein disclosed may be applied to a variety of uses but is especially suited for use on airplanes for mounting sensitive instruments or instrument-carrying panels so that the instruments will be protected from shocks and vibrations.

Proceeding with the detailed description of my improved vibration dampener, it will be seen that the plate member 10 comprises a quadrangular member having an opening 13 lying wholly within its outer edges. The plate member may be formed of suitable material such as metal or plastic and may have openings 15 in the corner portions thereof by which this member may be riveted or otherwise connected with the bulkhead or other support to which the device is to be applied. Projecting into the opening 13 at a plurality of points are grooved segmental portions or hook-like elements 16 which are carried by or formed integral with the body of the plate member. In this instance I show the plate member provided with two of the elements 16 located in opposed or diametrical relation, but any desired number of these elements may be provided. As shown in Figs. 2 and 4, the elements 16 have somewhat the form of outwardly opening hooks providing arcuate grooves 17 in which portions of the rubber ring 12 engage. Outwardly of the elements 16 the plate member 10 has arcuate shoulders 18 formed thereon which are engaged by the outer edge of the rubber ring and conform with the latter as to radius of curvature.

The spider member 11 has a hollow stem portion 14 which extends through the opening 13 and carries a plurality of grooved integral projections 20. These projections extend outwardly or laterally from the stem portion and are disposed in intermeshing relation with the grooved elements 16 of the plate member 10 when the plate and spider members are in assembled relation, as shown in Figs. 1 to 3, inclusive. In this instance the spider member is provided with two of the grooved projections 20 although the number may be increased or varied to correspond with the number of grooved elements 16 provided on the plate member.

The ring 12 is preferably formed of soft rubber, which may be either a natural or synthetic rubber, or may be formed of any other material having rubber-like characteristics. The rubber ring 12 is the sole connecting means between the plate and spider members and engages in the grooves 21 of the projections 20 as well as in the grooved elements 16. When the plate and spider members are in assembled relation, as shown in Fig. 1, clearance spaces exist between the intermeshing grooved elements 16 and 20 so as to permit relative rocking or tilting between the members.

An important feature of my invention consists in the provision of means for limiting or checking the relative movement between the flexibly connected plate and spider members 10 and 11. For this purpose I provide one of the members with stop elements which extend in overlapping relation to the other member and cooperate with portions of the rubber ring which serve as bumper elements. In the vibration dampener here illustrated one pair of such stop elements are provided on the spider member 11 and consists of laterally extending integral projections 22 located at one end of the hollow stem portion 14. The stop elements 22 extend in spaced overlapping relation to the plate member 10 and to axially extending bumper elements 23 provided on the rubber ring 12. The bumper elements 23 may comprise arcuate sections or extensions on the rubber ring which are engaged by one or both of the stop elements 22 when predetermined relative axial movement in one direction occurs between the spider member and the plate member or when predetermined relative tilting occurs between these members.

Another pair of stop elements may be provided on the spider member 11 by extending the lower arms 24 of the grooved projections 20 laterally so that these arms extend in overlapping relation to the sides or bar portions 10b of the plate member. At the points where the extended arms or stop elements 24 overlap the plate member 10 the rubber ring 12 is provided with laterally projecting sections or lugs 25 which form bumper elements lying adjacent the stop elements 24. It will be observed that the stop elements 24 and the bumper elements 25 with which they cooperate are spaced or offset 90° from the stop elements 22 and their bumper elements 23.

In the released or unloaded condition of my vibration dampener the bumper elements 25 of the rubber ring may bear against the under side of the bar portions 10b of the plate member, but when the device is subjected to load, the spider member 11 is displaced axially a distance which depends on the magnitude of the load, and the bumper elements 25 then occupy a position spaced somewhat from the bar portions 10b, as shown in Fig. 3. Whenever a predetermined axial movement in the opposite direction occurs between the plate and spider members or when a predetermined relative tilting occurs, one or both of the bumper elements 25 will be subjected to compression between the stop elements 24 and the bar portions 10b. In the construction just described either the extended arms 24 or the bar portions 10b can be considered to be the stop elements, or both pairs of these elements can be considered to be stop elements. Since the device embodies two pairs of the bumper elements spaced 90° apart, it will be seen that in addition to cushioning and limiting excessive relative axial movements in both directions they will also cushion and limit excessive relative tilting movements in all directions.

In addition to the bumper elements 23 and 25 provided on the rubber ring 12, this member may also carry a plurality of spaced internal teeth or projections 26 which extend into the clearance spaces between the intermeshing grooved projections 16 and 20. These teeth or internal projections of the rubber ring serve to hold the connected members against relative rotation so that the clearance spaces and the desired relative angular positions of the members will always be maintained.

My improved vibration dampener can be used singly or in multiple for mounting instruments or other bodies, but considerably greater flexibility is obtained when a multiple arrangement of the devices is used. In Fig. 7 I show a mounting formed by using two of my vibration dampeners together. Both of these dampeners are identical in construction with the vibration dampener shown in Figs. 1 to 3, inclusive, but the dampener 30 is reversed and rotated 90° with respect to the dampener 31. In this multiple mounting the spider members 11a are rigidly connected together by a clamping bolt 32 extending through the hollow stem portions thereof. The plate member 10a of the dampener 31 is connected with a bulkhead 33 or other support as by being mounted in an opening 33a and being riveted or otherwise connected to the bulkhead. The instrument or instrument-carrying panel 34 is connected in a similar manner with the plate member 10a of the dampener 30.

In the multiple mount just described, it will be seen that by reversing the dampener 30 with respect to the dampener 31, a desired arrangement is obtained by which the rubber ring of the dampener 30 will be subjected to tension and the rubber ring of the dampener 31 will be subjected to compression when excessive downward movement of the load 34 occurs. On the other hand, when excessive upward movement of the load 34 occurs, the rubber king of the dampener 30 will be subjected to compression and the rubber ring of the dampener 31 will be subjected to tension. This is a desirable arrangement in which compensation is automatically made and the rubber rings function more efficiently and satisfactorily in absorbing shocks and vibrations.

From the foregoing description and the accompanying drawing, it will now be readily understood that I have provided an improved vibration dampener which, although of very simple and economical construction, is very strong and durable and provides an efficient and satisfactory means for mounting instruments on airplanes and for various other purposes where the ability of the mounting means to absorb shocks and vibrations is of prime consideration. It will also be seen that excessive relative axial movements and excessive relative tilting movements in all directions will be limited and cushioned by the cooperating stop and bumper elements embodied in the device.

While I have illustrated and described my improved vibration dampener in considerable detail, it will be understood, of course, that I do not wish to be limited to the particular construction and arrangements of parts herein disclosed, but regard my invention as including such changes and modifications as do not constitute a departure

Having thus described my invention, I claim:

1. A vibration dampener comprising a plate member having an opening therein, a spider member extending through said opening, said members having portions thereof extending into overlapping relation at points disposed around said spider member and spaced substantially 90° apart, projections on said members extending into intermeshing relation with clearance therebetween, and a body of yieldable rubber engaging said projections and forming a resilient connection between said members, said rubber body having integral bumper elements thereon disposed around said spider member and spaced apart substantially 90° and adapted to be engaged by the overlapping portions of said members for limiting relative movement between the members.

2. A vibration dampener comprising a plate member having an opening therein, a spider member extending through said opening, said members having projections extending into intermeshing relation with clearance therebetween, and a rubber ring engaging said projections and forming a yieldable connection between said members, said spider member having pairs of laterally projecting stop elements spaced apart substantially 90° and extending into overlapping relation with portions of said plate member, said rubber ring having bumper elements adapted to cooperate with said stop elements for limiting relative movement in all directions between said members.

3. A vibration dampener comprising a plate member having an opening therein, a spider member extending through said opening, said members having grooved projections extending into intermeshing relation in said opening, and a rubber ring surrounding the spider member and engaging in said grooved projections for forming a resilient connection between said members, one of said members having pairs of stop portions spaced apart substantially 90° and extending laterally into overlapping relation with the other member and said rubber ring having bumper portions adapted to be subjected to compression by such overlapping portions for limiting relative movement between said members.

4. A vibration dampener comprising a pair of coaxial members having projecting portions in intermeshing relation with clearance therebetween and flexibly connected by a resilient rubber body, one of said members having stop elements projecting laterally therefrom at substantially right angles to each other, said stop elements being spaced axially and extending into overlapping relation with the other member so as to lie above and below said other member and said rubber body having bumper portions adapted to cooperate with said stop elements for limiting relative movement between said members.

5. A vibration dampener comprising a plate member having an opening, a spider member having a stem portion extending through said opening, said plate member and spider member having grooved portions in intermeshing relation in said opening, a rubber ring engaging in said grooved portions and providing a resilient connection between said members, and means for limiting relative movement between said members comprising integral bumper elements on said ring and pairs of stop elements on said spider member adapted to cooperate with said bumper elements, said grooved portions of the spider having arm extensions in overlapping relation with said plate member and forming one pair of said stop elements and another pair of said stop elements being formed by lateral projections of the stem of the spider disposed at substantially right angles to said arm extensions and which also extend into overlapping relation to the plate member.

6. A vibration dampener comprising a plate member having an opening, a spider member having a stem portion extending through said opening, said plate member and spider member having grooved portions in intermeshing relation in said opening, a rubber ring engaging in said grooved portions and providing a resilient connection between said members, and means for limiting relative movement between said members comprising integral bumper elements on said ring and a pair of stop elements on said spider member adapted to cooperate with said bumper elements, said stop elements being formed by lateral extensions of the grooved portions of said spider member and which extend into overlapping relation with said plate member.

HAROLD A. STORCH.